Patented Oct. 2, 1934

1,975,458

UNITED STATES PATENT OFFICE 1,975,458

MANUFACTURE OF COLD MIX PAVING MATERIAL

Alfred S. Hirzel, Wilmington, Del.

No Drawing. Application May 25, 1931, Serial No. 539,824

2 Claims. (Cl. 106—31)

Certain bituminous pavements of the cold mix type are manufactured by the addition to the paving mixture of a volatile solvent known as a "liquefier" by the addition of which the asphaltic cement is maintained sufficiently soft at atmospheric temperatures to permit the paving mixture, consisting of a suitable mineral aggregate and a suitable asphaltic cement, to be laid cold. For a time after they have been laid and compacted they rely for their stability largely upon a proper interlocking of the stone of the aggregate, but as the liquefier, which was added to the asphaltic cement evaporates, the cement hardens and by its cementitious qualities adds and makes permanent the stability of the pavement. Hydrated lime is usually added to such paving mixtures.

It is also an improved practice to add to the mixture a bituminous filler usually consisting of a finely graded mineral filler passing a ten mesh screen combined with a harder asphalt, as for example, a blown asphalt.

In all pavements of this type care must be exercised to avoid the addition of too much liquefier whereby the cementitious value of the asphaltic cement (which is the bituminous binder) is destroyed, and the paving mixture rendered too unstable to permit of proper compaction under traffic. This difficulty is increased when there is employed a bituminous filler such as I have described, because the addition of the fine mineral matter contained in said filler calls for an increased quantity of liquefier to coat the surfaces of these small particles, and also because the addition of such small particles, if more in quantity than sufficient to fill the voids of the larger stone of the aggregate, forces such larger particles apart and lessens the inherent stability of the aggregate which, as already explained, is in part relied upon to render the pavement stable enough to admit of compaction under traffic prior to the evaporation of the liquefier.

I have discovered that this difficulty may be overcome and a cold mix paving material manufactured and laid with more facility and with better results by using as a liquefier two oils of differing characteristics applied successively to the aggregate and my invention therefore relates to an improved method of preparing a cold mix paving material which consists in applying to the mineral particles which constitute the aggregate of the mixture, first a more volatile oil such as naphtha, and thereafter a less volatile oil such as a road oil. These applications are made to the aggregate in the mixer (or mixers in case two kinds of aggregate are used) and then the asphaltic cement in proper quantity is added with continuation of the mixing until a homogeneous mass results.

It is unnecessary to describe the general process of the manufacture of a cold mix paving material of the above described type as this is well known. The manufacture of a bituminous filler for use in this type of pavement is also well known, one such method having been described in the Downard Patent No. 1,662,377. In all of these processes it is customary to place the stone of a suitable grade or grades and suitably dried and heated if necessary, in a mixer and then add the liquefier. My invention relates to this part of the process. I first add as a liquefier a suitable petroleum naphtha, for example one which, when distilled in accordance with A. S. T. M. method shall have an overpoint of not greater than 225° F. and a dry point of not more than 450° F. The naphtha should show a continuous distillate between these points and should not be kerosene or other slower volatilizing petroleum distillate. A sufficient quantity of this liquefier to moisten and thoroughly coat the stone is added to the stone in the mixer, preferably from a graduated measure whereby the exact quantity may be poured on to uniformly penetrate the surface voids of the aggregate and fully coat the surfaces thereof as the whole mass is sufficiently mixed, mixing being continued until the mass is uniformly moistened.

There is then added to this material a proper quantity similarly measured of a fluid residual oil free from water, for example one meeting the following requirements:

Specific gravity—60 degrees F.—0.9 to 0.93
Flash point (open cup)—not less than 160° F.
Asphalt content @ 100 Pen.—30 to 35%
Evaporation loss—50 grs. 5 hrs. at 325 degrees F.—not more than 30%
Engler specific viscosity—50 cc. at 77 degrees F.—4 to 7
Bitumen soluble $CS_2$—not less than 99.5%
Percent of total bitumen insoluble in 86° naphtha—not less than 6.0%

Enough of this residual oil is added to thoroughly cover the surfaces of the solvent coated particles of the aggregate.

To the aggregate thus prepared and coated there is added the proper quantity of a soft bituminous material constituting the desired asphaltic cement for the production of the pavement. Hydrated lime may or may not be added as desired. It may be desirable to add a bituminous filler consisting of the finer part of the aggregate coated successively with liquefier and residual oil as above explained and mixed with a harder asphalt. The mixture of these materials is continued until a homogeneous mass results, and if the aggregate and cementing material are prepared in two or more batches, each is thus prepared and the resultant mixtures combined and intermixed in a mixer.

The result is a cold mix paving mixture granular in its structure and not yet coalesced into a stable mass. This granular mixture may be stored, transported at atmospheric temperatures, laid in place on the roadway, and compacted under rolling and traffic. After such compaction it will have sufficient stability to bear traffic until the volatile liquefier evaporates with formation of a stable, dense, waterproof bituminous surfacing for a road.

The penetrations and other qualities of the asphalts and oils which enter into the permanent paving material, are so chosen that when combined and compacted in place the asphaltic cement of the pavement possesses the desired cementitious and stabilizing qualities.

By carrying out the production of such a pavement in the method which I have described I find that a larger quantity of liquefier and oil may be employed without loss of that stability in the resulting mixture of the aggregate and the cement which is required to effectively lay and compact the cold mix. I attribute this result to the fact that the liquefier does not immediately reach the asphalt cement, being separated therefrom by a film of road oil which was applied to the aggregate after it was coated by the liquefier. By reason of this a considerable quantity of the liquefier merely softens the road oil film without actually reaching the asphalt, the road oil acting as a retardent. The volatilization of the liquefier is therefore a slower process and at no time does the liquefier used too greatly soften the asphaltic cement rendering difficult the proper compaction of the mixture. On the contrary, notwithstanding such increased quantity of liquefier as may be required to coat the finer particles of the bituminous filler, the asphaltic cement is at no time unduly softened, the granular condition of the mix is properly maintained, and yet ultimately the liquefier is yielded up, evaporated and a satisfactorily compacted and thoroughly homogeneous bituminous paving produced.

The present invention therefore has to do with the addition to the stone mix before the cement is added to it of two materials in a specified order of succession, the first constituting a liquefier and the second an oil retardent. It is this which enables the aggregate to be completely coated by the liquefier without too greatly thinning the cement. The addition of fines increases the amount of liquefier required to coat them so that if it were not for the addition of the oil retardent, the cement would be too much softened; but by means of these two additions in the order named there is secured to the cement sufficient but not too great plasticity during transportation and laying. By the time transportation and laying have been completed most of the liquefier has evaporated, including the volatile parts of the retardent and there remains a much less plastic mixture which, however, is soft enough to compact on the road under traffic over a period of time and to harden only slowly after enough of such compaction has been secured.

Having thus described my invention, I claim:

1. The process of manufacturing a bituminous paving mixture which consists of coating a stone aggregate with a volatile solvent as a liquefier, thereafter coating the solvent coated particles of the aggregate with a road oil, thereafter combining these particles thus coated with an asphaltic cement with production of a granular cold mix paving material.

2. The process of preparing a bituminous paving mixture which consists in successively coating the coarser parts of an aggregate with a liquefier and a road oil; and also successively coating the finer parts of an aggregate with a liquefier and a road oil, combining with each of these coated aggregates a proper quantity of a suitable asphaltic cement and combining and thoroughly intermixing the two mixtures thus produced with production of a granular cold mix paving material.

ALFRED S. HIRZEL.